United States Patent
Aizawa et al.

(10) Patent No.: US 7,486,816 B2
(45) Date of Patent: Feb. 3, 2009

(54) THREE-DIMENSIONAL MEASUREMENT APPARATUS

(75) Inventors: Atsushi Aizawa, Yamanashi (JP); Toshinari Tamura, Gotenba (JP)

(73) Assignee: Fanuc Ltd, Yamanashi (JP)

( * ) Notice: Subject to any disclaimer, the term of this patent is extended or adjusted under 35 U.S.C. 154(b) by 799 days.

(21) Appl. No.: 10/962,542

(22) Filed: Oct. 13, 2004

(65) Prior Publication Data

US 2005/0084149 A1    Apr. 21, 2005

(30) Foreign Application Priority Data

Oct. 16, 2003  (JP) .............................. 2003-356747

(51) Int. Cl.
*G06K 9/00*   (2006.01)
*G01C 3/14*   (2006.01)
*G02B 27/22*  (2006.01)
*G06T 15/00*  (2006.01)

(52) U.S. Cl. ...................... 382/154; 356/12; 359/462; 345/419

(58) Field of Classification Search ................. 382/154; 356/12; 359/462; 345/419
See application file for complete search history.

(56) References Cited

U.S. PATENT DOCUMENTS

| | | | |
|---|---|---|---|
| 5,359,672 | A  |   | 10/1994 | Okamura et al. |
| 5,694,483 | A * | 12/1997 | Onoguchi ................... 382/154 |
| 5,852,672 | A * | 12/1998 | Lu ............................. 382/154 |
| 5,995,245 | A * | 11/1999 | Moro ......................... 358/474 |
| 6,084,980 | A * |  7/2000 | Nguyen et al. ............. 382/154 |
| 6,233,049 | B1 * | 5/2001 | Kondo et al. ............... 356/623 |
| 6,909,799 | B1 |  6/2005 | Wildmann et al. ......... 382/152 |
| 6,965,689 | B2 * | 11/2005 | Lee et al. ................... 382/154 |
| 7,024,027 | B1 * | 4/2006 | Suri et al. ................... 382/130 |
| 7,170,592 | B2 * | 1/2007 | Mydlack et al. .......... 356/237.1 |
| 7,253,420 | B2 * | 8/2007 | Motomura ................ 250/458.1 |
| 2002/0159072 | A1 * | 10/2002 | Fujii et al. .................. 356/601 |

(Continued)

FOREIGN PATENT DOCUMENTS

EP    0 486 701 A1    5/1992

(Continued)

OTHER PUBLICATIONS

EP Search Report for corresponding EP Application No. 04256285.0-2213 mailed Jan. 28, 2005.

(Continued)

*Primary Examiner*—Jingge Wu
*Assistant Examiner*—Kathleen S Yuan
(74) *Attorney, Agent, or Firm*—Staas & Halsey LLP

(57) ABSTRACT

A three-dimensional measurement apparatus of a slit light (or pseudo slit light) projection type that is adapted to prevent deterioration of measurement accuracy and to be easily miniaturized. Detected positions C1, C2 are adopted that are determined so as to correspond to scanning lines on each of which a number of brightened pixels falls within an allowable range are detected. The allowable range varies from Nav × amin to Nav × amax or from Nav−β to Nav +γ, where Nav is an average of the numbers of brightened pixels detected on scanning lines for each of which at least one pixel is determined, and amin, amax, β, and γ are minimum proper ratio, maximum proper ratio, subtract number of pixels, and add number of pixels, respectively, which are set in advance as parameters.

6 Claims, 6 Drawing Sheets

U.S. PATENT DOCUMENTS

2004/0239673 A1* 12/2004 Schmidt .................... 345/426
2004/0246479 A1* 12/2004 Cartlidge et al. ............ 356/335

FOREIGN PATENT DOCUMENTS

| | | |
|---|---|---|
| EP | 1 245 923 A2 | 10/2002 |
| EP | 1 245 923 A3 | 10/2002 |
| JP | 59-008086 | 1/1984 |
| JP | 61-191905 | 8/1986 |
| JP | 63-132107 | 6/1988 |
| JP | 04-040572 | 2/1992 |
| JP | 10-185516 | 7/1998 |

OTHER PUBLICATIONS

Notification of Grounds for Rejection (Office Action) in corresponding Japan Patent Application No. 356747/2003 mailed Apr. 11, 2006.
U.S. 6,909,799 corresponds to references AJ (EP 1 245 923 A2) and AK (EP 1 245 923 A3).

\* cited by examiner

THREE-DIMENSIONAL MEASUREMENT APPARATUS

BACKGROUND OF THE INVENTION

1. Field of the Invention

The present invention relates to a three-dimensional measurement apparatus in which slit light or pseudo slit light simulatedly created by scanning spot light is irradiated onto an object to form a linear bright portion, the bright portion is detected by image capturing means, and information related to three-dimensional position of the object is obtained from the position of the bright portion in the captured image. The three-dimensional measurement apparatus of the present invention is used as being mounted to a robot, for instance.

2. Description of Related Art

Recently robots have been made more intelligent, whereby in many cases peripheral equipment such as a workpiece supplying and positioning apparatus is simplified. A three-dimensional measurement apparatus that recognizes the three-dimensional position, orientation, shape, size, etc. (hereinafter collectively referred to as "three-dimensional position-related information") of a workpiece serves as important basic means for intelligent robots. Since the three-dimensional measurement apparatus is often used by being mounted to a robot, the measurement apparatus is demanded not only to have high accuracy but also to be miniaturized.

In the three-dimensional measurement apparatus in which slit light (hereinafter the term "slit light" is a generic name including "pseudo slit light created by spot light scanning") is irradiated onto a measurement object by using a projector to form a bright portion, light (scattered or reflected light) from the bright portion is detected by a photodetector, and three-dimensional position-related information of the measurement object is measured from the position of the detected bright portion in the detected image, the projector 10 and the photodetector 20 are juxtaposed to each other with a spacing, as shown in FIG. 6a. Thus, the measurement apparatus can be miniaturized by decreasing the installation distance between the projector 10 and the photodetector 20, as shown in FIG. 6b.

When the measurement apparatus is miniaturized by using such approach, however, the measurement accuracy (especially, the measurement accuracy in the depth direction as seen from the measurement apparatus) is liable to be worsened due to the measurement principle. That is, in the three-dimensional measurement apparatus of the slit light projection type, there are in general conflicting requirements of miniaturizing the apparatus and improving the measurement accuracy. Therefore, and from the viewpoint of compensating demerit due to the miniaturization, the technical art of providing a highly accurate three-dimensional measurement apparatus of the slit light projection type has been strongly demanded.

Under these circumstances, an "object measurement apparatus based on light-section method" has been proposed in JP 8-10130B, for instance. This proposal relates to an object measurement apparatus for measuring the position of a light section line in an image with accuracy higher than the resolution of an image pickup element, and for performing high speed calculation processing to realize a high speed measurement. The apparatus disclosed in JP 8-10130B adopts a method in which a luminance variation in a difference image between an original image and an image observed when slit light is irradiated onto a section line is examined in the direction of each scanning line of a camera, and the center position of the slit light for every scanning line is determined by performing weighted mean processing based on a distribution of luminance that is higher than or equal to a certain threshold.

According to this prior art, however, if a surface portion of a measurement object onto which slit light is irradiated is different in the degree of stain or surface roughness from the remainder, a detected linear bright portion becomes narrow in width or its center position (which indicates the "center position observed when the bright portion is traversed in width direction" (ditto in the following)) is shifted, sometimes resulting in the detected data being largely disturbed. This causes deterioration in the accuracy of detection. Such deterioration becomes more noticeable when the just-mentioned cause and the miniaturization of the measurement apparatus conspire to deteriorate the detection accuracy. Therefore, it is difficult to achieve the miniaturization without causing deterioration in the detection accuracy.

SUMMARY OF THE INVENTION

This invention provides a three-dimensional measurement apparatus capable of ensuring the required measurement accuracy in detecting a bright portion formed by irradiation of slit light, even if detected data is somewhat disturbed by uneven stain on or uneven roughness of a measurement object surface, or the like.

In the aforementioned slit light projection type three-dimensional measurement apparatus, this invention makes it possible to exclude irreliable detection data so that three-dimensional position-related information can be used for the measurement, even if the detection data is somewhat disturbed by uneven stain on or uneven roughness of a measurement object surface, or the like.

A three-dimensional measurement apparatus of the present invention obtains information related to three-dimensional position of an object based on detection of a position of a bright portion, which is formed substantially linearly by irradiating slit light or pseudo slit light created by scanning spot light onto the object, in an image of the object captured by image capturing means. This three-dimensional measurement apparatus is provided with at least the following means (a)-(c):

(a) means for counting the number of brightened pixels belonging to the bright portion along each of a plurality of detection lines traversing the bright portion in the captured image;

(b) means for determining an allowable range of the number of brightened pixels along one detection line based on the numbers of brightened pixels respectively counted along the plurality of detection lines; and (c) means for adopting data of the brightened pixels along each detection line where the number of brightened pixels is within the allowable range as proper data for obtaining the information related to three-dimensional position of the object.

The information related to three-dimensional position of the object may include any one of a three-dimensional position, a three-dimensional posture, a three-dimensional shape and a size of the object.

The means for determining the allowable range may comprise: means for obtaining an average of the number of brightened pixels per one detection line based on the numbers of brightened pixels counted respectively along the plurality of detection lines; and means for calculating the allowable range based on the obtained average of the number of brightened pixels and minimum and maximum ratios to be respectively multiplied by the determined average of the number of brightened pixels.

Alternatively, the means for determining the allowable range comprises: means for obtaining an average of the number of brightened pixels per one detection line based on the numbers of brightened pixels counted respectively along the plurality of detection lines; and means for calculating the allowable range based on the obtained average of the number of brightened pixels, a subtractive number to be subtracted from the obtained average of the number of brightened pixels, and an addition number to be added to the obtained average of the number of brightened pixels.

The minimum and maximum ratios and the subtractive number and the addition numbers may be alterable in a similar manner to that in ordinary setting parameters.

According to the present invention, it is possible to exclude irreliable data to obtain three-dimensional position-related information that can be used for the measurement, even when slit light is irradiated onto a surface portion of a measurement object that is different in the degree of stain or surface roughness from the remainder and as a result the detected linear bright portion becomes narrow in width or its center position is shifted. This makes it possible to attain an advantage that "the measurement can be performed without being affected by the surface condition of the measurement object," while achieving an advantage of the prior art that "the position of slit light can be measured with accuracy higher than the resolution of the image pickup element." From another point of view, this invention can suppress a variation in measurement accuracy, and therefore, it is easy to make the installation distance between a projector and a photodetector narrower, thereby miniaturizing the measurement apparatus.

BRIEF DESCRIPTION OF THE DRAWINGS

FIG. 4b is an enlarged view of a region which includes a disturbance in the bright portion image, and FIG. 4c is a view exemplarily showing a deviation between the detected position and the actual incident position of slit light;

FIGS. 6a and 6b are views for explaining relationships between the installation distance between a projector and a photodetector and the miniaturization of a measurement apparatus, wherein FIG. 6a shows an arrangement where the distance between the projector and the photodetector is wide, and FIG. 6b shows an arrangement where the distance therebetween is narrow.

DETAILED DESCRIPTION

Figure 1:
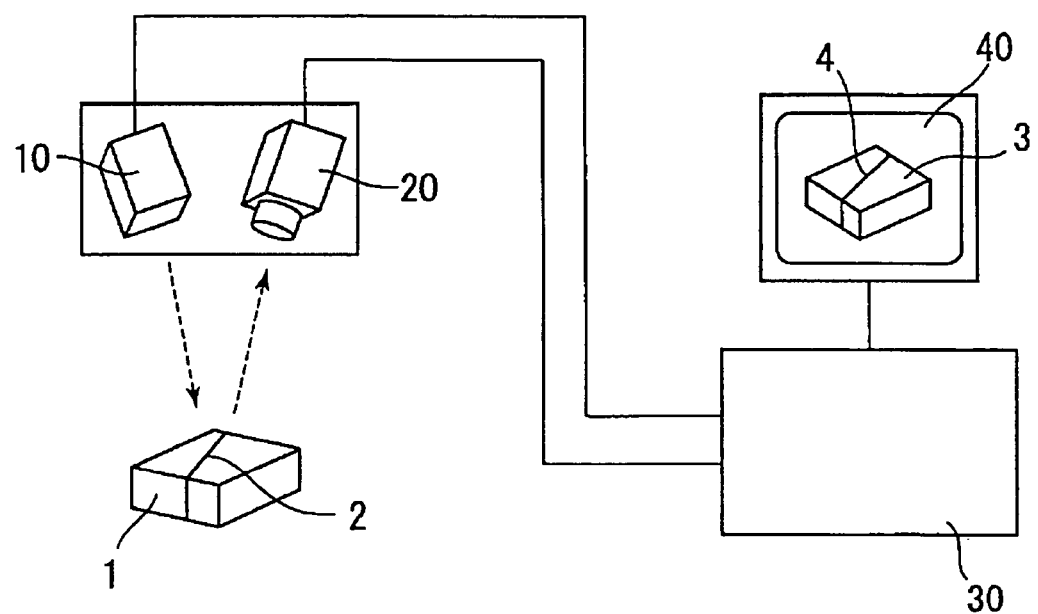
FIG. 1 is a view showing the overall construction of a three-dimensional measurement apparatus according to this invention.

In the following, an embodiment of this invention will be explained with reference to FIGS. 1-5, in which FIG. 1 is a view showing the overall arrangement of a three-dimensional measurement apparatus according to one embodiment of this invention. In FIG. 1, a projector for projecting slit light (including pseudo slit light obtained by spot light scanning, as previously mentioned) is denoted by reference numeral 10. A photodetector 20 is disposed at a slight distance from the projector 10. The projector 10 and the photodetector 20 are united into a detection head which is used by being mounted to near an arm distal end of a robot (not shown), for instance. In a case where a robot is not used, the projector and the photodetector are disposed at appropriate places. Even in a case where a robot is used, they may be disposed at appropriate places, without being mounted to the robot.

As previously mentioned, the larger the installation distance between the projector 10 and the photodetector 20 is, the more easily the measurement accuracy (especially, measurement accuracy in the depth direction as seen from the projector and the photodetector) can be ensured, but the more difficult it is to meet the need of miniaturization. Thus, the installation distance is determined by taking the balance into consideration. According to this invention, a variation in the measurement accuracy can advantageously be suppressed, and therefore, it is easier than in the prior art to decrease the installation distance between the projector and the photodetector.

The projector 10 projects slit light onto a measurement object (for example, a workpiece) 1 in a known manner to thereby form a linear bright portion 2 on a surface of the measurement object 1. Resulting from light projected from the projector 10, scattered light or reflected light is provided from the bright portion 2. The light from the bright portion 2 is detected by the photodetector 20, together with light (scattered light or reflected light resulting from light originally present in the working environment) provided from around the bright portion 2. The photodetector 20 is constituted by a digital CCD camera for instance, which is connected to an image processing unit 30 together with the projector 10. The image processing unit 30 is adapted to control the on/off action of the projector 10, image pickup of the photodetector 20, subsequent image fetching, etc.

In a case where the detection head is mounted to a robot, the robot's position and orientation at the time of measurement are determined so as to select the direction of projection from the projector 20 (or select the three-dimensional orientation of a slit light plane). When the detection head is not mounted to the robot, the direction of projection can be adjusted by using an appropriate adjustment mechanism. In any case, as shown in FIG. 1, the projector 10 is turned on whereby a linear bright portion 2 is formed such as to pass through an arbitrary to-be-measured portion of the measurement object 1, and an image of the bright portion 2 is picked up by the photodetector 20. In this case, image data including the bright portion 2 (at least part thereof) is fetched into the image processing unit 30 and displayed as a detected image on a screen of a monitor display 40 connected to the image processing unit 30. Except for the below-mentioned software (refer to explanations of this embodiment), the image processing unit 30 has conventionally known construction and functions, and therefore, detailed explanations thereof will be omitted.

In FIG. 1, the detected image includes an image of the measurement object 1 denoted by reference numeral 3 and an image of the bright portion 2 denoted by reference numeral 4. The bright portion 2 or its image 4 is generally formed into a linear shape or a band-like shape with a certain width, but can include a disturbed part or a disconnected part as will be mentioned below. It is assumed here that the bright portion will be expressed as "linear bright portion" or "linear bright portion image," etc., even if there is such a disturbance.

As well known, position-related information of the measurement object 1 in the three-dimensional space is determined from the position of the bright portion image 4 in the detected image. That is, the three-dimensional position of one or more points in space, corresponding to one or more points in the bright portion image 4, is determined as detected data. For instance, on the basis of the detected data, the following are measured: three-dimensional position of the measurement object 1 (for example, the position of a characteristic point representative of the measurement object 1); three-dimensional orientation (for instance, the orientation of a surface and the extending direction of a ridge line, which represent the orientation of the measurement object 1); three-dimensional shape (for example, the roundness of a circular profile); size (for example, the diameter of a circular hole); and the like. A method for calculating these parameters from the detected data corresponding to the bright portion image 4 has been well known and does not directly relate to this invention, so that detailed explanations thereof will be omitted.

Figure 2:
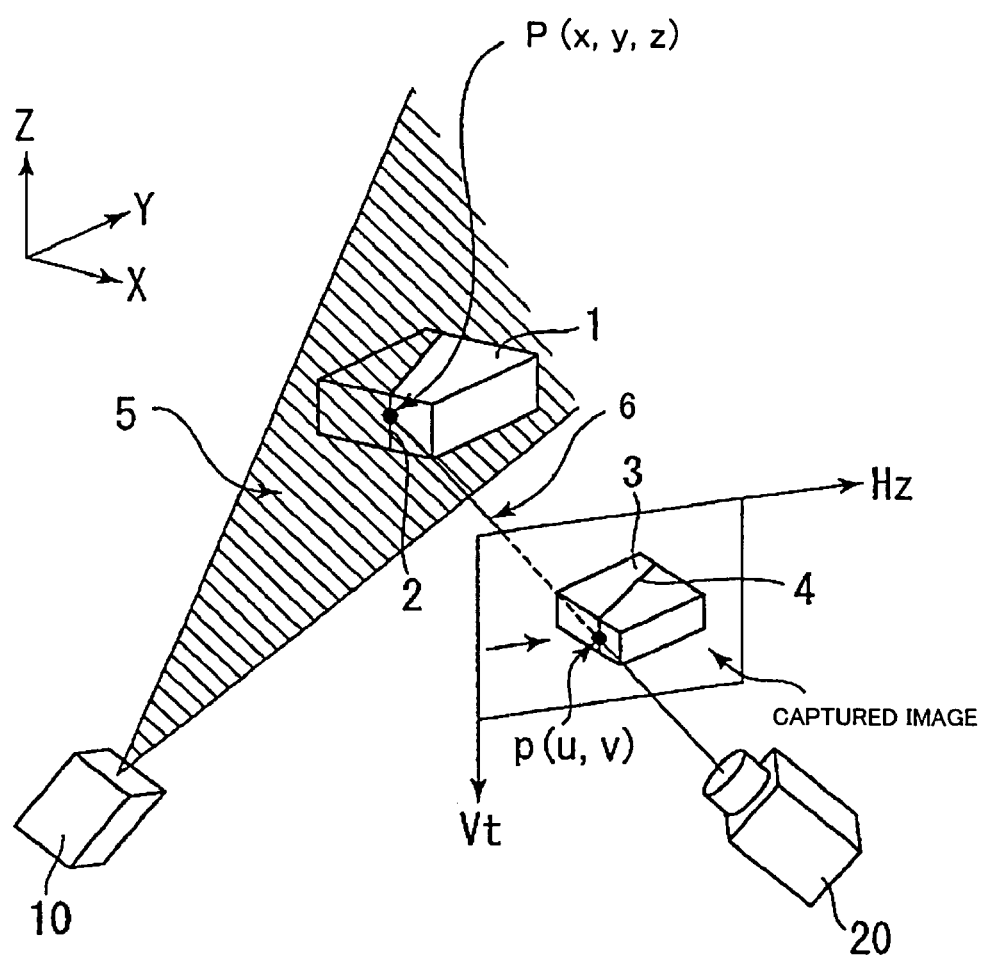
FIG. 2 is a view for explaining a method for determining a three-dimensional position of a bright portion from a detected image of the bright portion formed by the projection of slit light.

The present invention is characterized in a "way of selecting the detected data corresponding to the bright portion image 4" that is used for the calculation of the three-dimensional position-related information. In the following, particulars relating to this feature will mainly be explained. FIG. 2 is a view for explaining a method for calculating the three-dimensional position of the bright portion 2 from the detected image of the bright portion 2 (bright portion image 4), which is formed by projection of slit light, by using the measurement apparatus shown in FIG. 1. Since this method is well known, only the outline thereof will be explained.

As illustrated in FIG. 2, when a light source of the projector 10 is turned on, slit light is output from a projecting port (not shown) of the projector 10, whereby a slit light plane 5 is formed that broadens in the shape of fan. The bright portion 2 is formed at a position where the slit light plane 5 crosses a surface of the measurement object 1, and is observed as the bright portion image 4 in the detected image obtained by image-picking up with the photodetector 20. It is assumed here that an arbitrary to-be-measured point which is on the bright portion 2, in other words, which is both on the surface of the measurement object 1 and on the slit light plane 5, is represented by P, and that the three-dimensional position of the point P in the real space (three-dimensional space) is represented by (x, y, z). It is further assumed that the position of a point p in the detected image corresponding to the point P (x, y, z) is represented by (u, v). The (u, v) is a coordinate value along Hz and Vt axes (horizontal and vertical axes) of a two-dimensional rectangular coordinate system that is set on the image plane.

It is also assumed that the scanning direction in the image pickup performed by an image receiving device is in parallel to the Hz axis.

Here, a straight line passing through both the point p and the lens center of the photodetector 20 is referred to as a line of sight 6. The position of the line of sight 6 in the real space (an equation describing the straight line for the line of sight 6, or parameter values that are necessary and sufficient to specify such equation) can be determined using calibration data that is stored in advance in the image processing unit 30. Therefore, the position (x, y, z) of the to-be-measured point P in the three-dimensional space is determined as the position of the point of intersection of the slit light plane 5 and the line of sight 6. Meanwhile, the position of the slit light plane 5 (an equation or parameter values that are necessary and sufficient to specify the equation) can be calculated from calibration data for the projector 10. In case that the projector 10 is mounted to a robot, the position of the slit light plane 5 can be calculated from the calibration data for the projector 10 and current robot position data.

In the above, the method has been described in which the three-dimensional position of the bright portion 2 is calculated by using the measurement apparatus shown in FIG. 1 from the detected image of the bright portion 2 (bright portion image 4) formed by the projection of slit light. In this method, it is the way of recognizing the position (u, v) of the point p in the detected image, which is known in the art, as well as the reliability of the resultant data that are to be considered as significant factors which can greatly vary the measurement accuracy. As noted previously, the actually obtained bright portion image 4 is generally formed as a linear bright region having a width. Therefore, by collecting data of detected luminous intensity (luminance) for each individual pixel along a scanning line of the photodetector 20 (scanning line at the time of image pickup), and by extracting pixels whose detected luminances exceed a certain threshold, it is possible from the data in respect of the extracted pixels to determine the detected position of the bright portion image 4 so as to correspond to each scanning line since the extracted pixels are on the scanning line and constitute part of the bright portion image 4.

Figure 3:
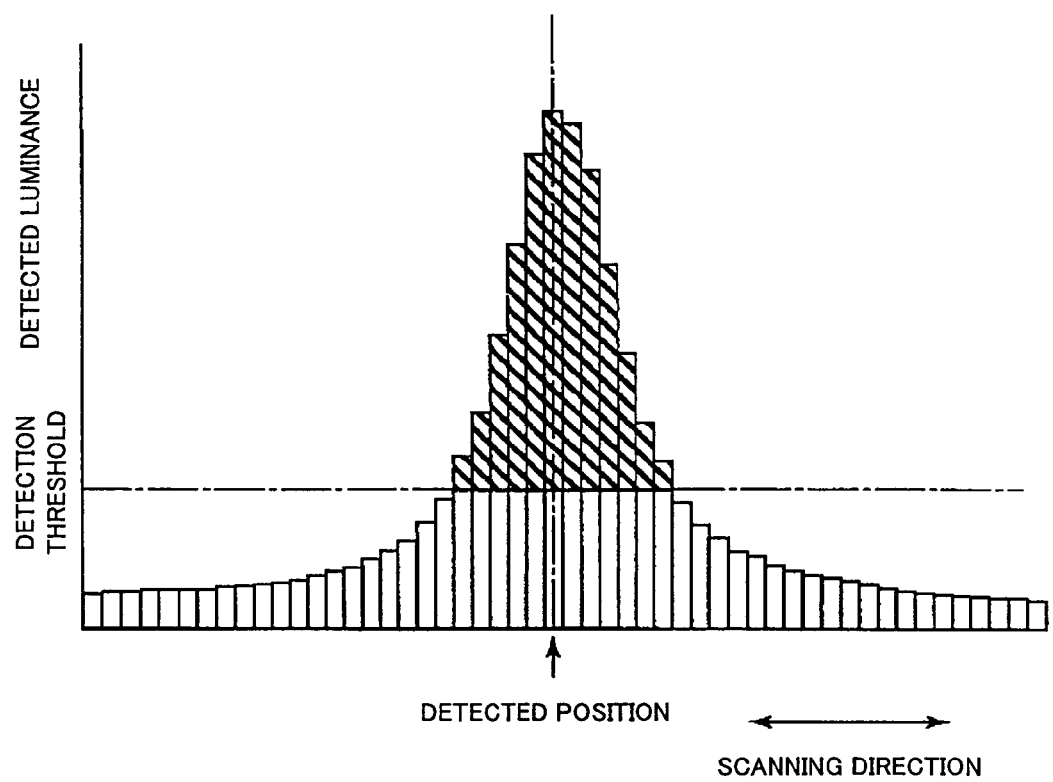
FIG. 3 is a view exemplarily showing luminance data of each of pixels detected along a scanning line crossing a bright portion image 4.

FIG. 3 exemplarily shows, in a bar chart, the luminance data of pixels along a scanning line crossing the bright portion image 4. Each bar width of the bar chart corresponds to one pixel. In order to determine the detected position of the bright portion image 4 corresponding to this scanning line from such luminance distribution, a weighted average luminance is first determined along the scanning direction with respect to the pixels for which luminances exceeding the detection threshold have been detected, and then the detected position is calculated. It is tentatively considered that by determining the detected position in the above manner, the detected position of the bright portion image 4 can be determined with accuracy which is more precise than the pixel width, thereby improving the accuracy of three-dimensional position-related information that will be obtained on the basis of the detected position thus determined.

In actual, however, the above concept is not often the case mainly for the reason that various disturbances or abnormalities are produced in the luminance distribution for pixels along a scanning line. More specifically, when a stain is on the measurement object or when the surface roughness of the measurement object is uneven place by place, the disturbance or unevenness naturally occurs in the reflection characteristic of the measurement object observed when light is projected thereto. As a result, by way of example, in some cases a disturbance occurs in the width (size) of the detected linear bright portion image 4, or disconnection occurs in the bright portion image 4 (there are no pixels whose luminance exceed the threshold), or the luminance distribution along a scanning line is split into two or more (resulting in a plurality of luminance peaks).

Figures 4A, 4B:
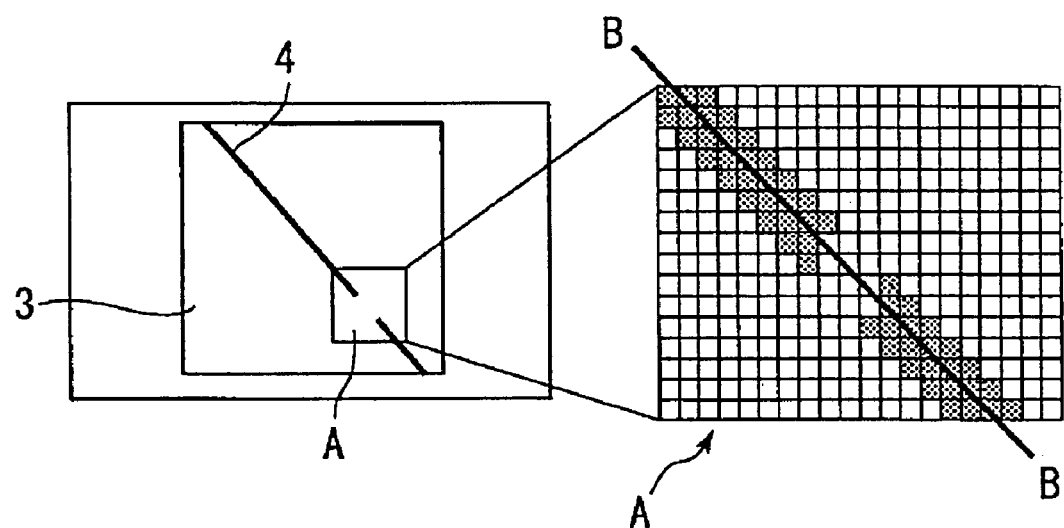
FIGS. 4a-4c are views for explaining occurrence of a difference between a detected position and an actual incident position of slit light, which is caused by a bright portion image being disturbed, wherein FIG. 4a schematically represents the entirety of a detected image.
Figure 4C:
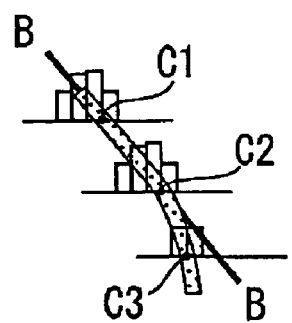

In a case where the measurement object 1 has its surface which is partly mirror-like, the slit light projected onto the measurement object 1 glares and is broadened in width, so that the number of pixels whose luminance exceed the threshold may increase abnormally. The three-dimensional position information measured at a location where such disturbance or abnormality occurs includes much error, causing deterioration in the detection accuracy. FIGS. 4a-4c schematically represent such situations.

FIG. 4a schematically shows the entire of a detected image, which includes a measurement object image 3 and a bright portion image 4. The bright portion image 4 extends linearly as a whole. For the above-mentioned reason, a disturbance occurs in a region shown by reference symbol A. FIG. 4b shows in a large scale the region A including the disturbance. In FIG. 4b, each square represents one pixel, and two-stage gray scale schematically shows whether or not the detected luminance for each individual pixel exceeds the threshold that is used for the determination of the bright portion pixel (refer to the graph shown in FIG. 3 and relevant explanations).

In FIGS. 4a and 4b, the direction of scanning for image pickup in the image receiving device is in the left-right direction.

The line denoted by symbol B-B represents a detected position line observed if an image of the incident position of the slit light projected onto the measurement object 1 were correctly detected. Considering in detail the example shown in FIG. 4b, at upper left and lower right parts of the region A, a group of pixels whose luminances exceed the threshold are linearly distributed with a certain width, in which no disturbance is found.

On the contrary, at a central part of the region A, there is a disturbance in or thinning of the linear distribution of pixels whose detected luminances exceed the threshold.

When the number of pixels having luminances exceeding the threshold is counted in the direction (here the left-right direction) of scanning in the image receiving device, the number of pixels counted for the part including a disturbance is considerably smaller than that counted for part not including a disturbance. If the detected position is calculated from a weighted average of luminances of a few pixels, the reliability of the result of calculation is poor, so that there is a possibility that the detected position is largely deviated from the correct detected position line B-B. FIG. 4c schematically shows such situation.

In FIG. 4c, symbols C1 and C2 each represent an example of the detected position calculated on the basis of luminances of detected pixels (which satisfy the threshold condition) that are collected along a scanning line passing through the part not including a disturbance. Symbol C3 represents an example of the detected position calculated based on luminances of a few pixels. There is substantially no difference between the detected positions C1, C2 and the correct detection line (the detected position reflecting the actual slit-light incident position) B-B. Contrary to this, the detected position C3 is largely deviated from the correct detection line B-B.

In this regard, according to this invention, detected position data having a high possibility of causing such a large deviation is eliminated from data that is to be used for the calculation of three-dimensional position information, in order to improve the accuracy and reliability of measurement. On the basis of this concept, in this embodiment, an allowable range of the number of detected pixels in the detected image per one scanning line is determined on the basis of those numbers of the detected pixels (which satisfy the threshold condition (ditto in the following)) which are individually counted for a plurality of scanning lines. If the number of detected pixels on a given scanning line falls within the allowable range, it is determined that the detected pixels on this scanning line are proper data that can be used for the measurement of three-dimensional position information of the measurement object. On the other hand, if the number of the detected pixels falls outside the allowable range, it is determined that the detected pixels are not proper data. As for the example shown in FIG. 4c, the detected positions C1, C2 are adopted as proper data, whereas the detected position C3 is not adopted as proper data, so that irreliable data is not reflected in the results of three-dimensional measurement, making it possible to avoid the measurement accuracy being lowered.

Figure 5:
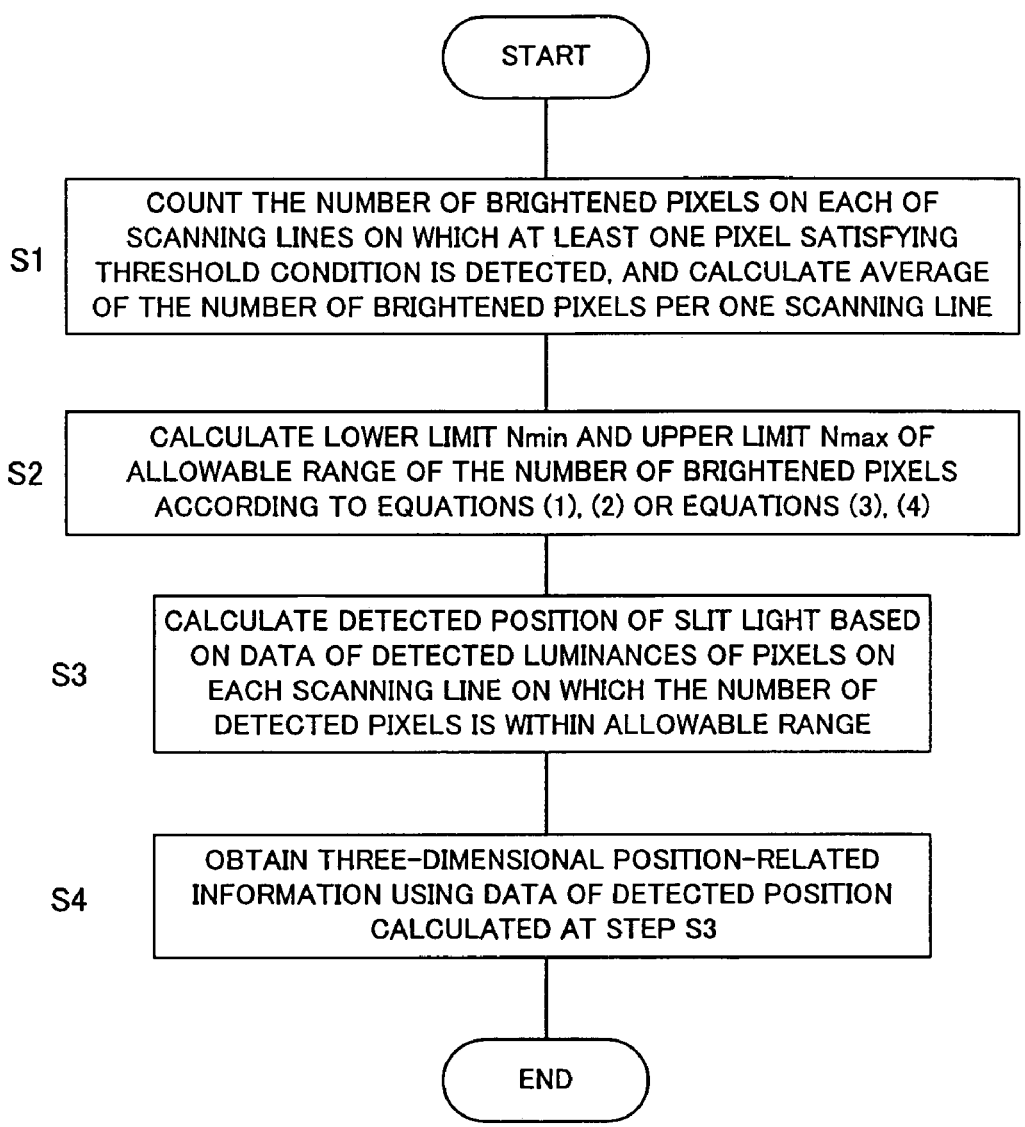
FIG. 5 is a flowchart schematically showing processing executed in an embodiment.
Figure 6A:
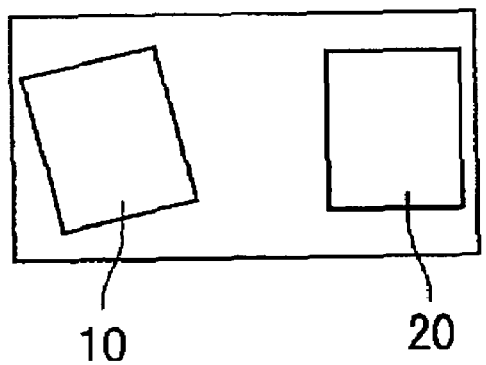
Figure 6B:
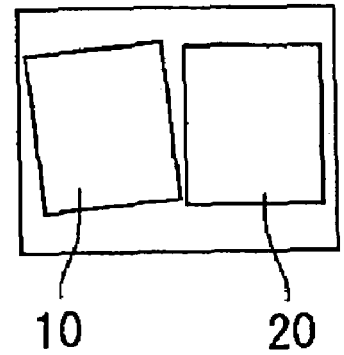

An example of concrete processing procedures including the aforementioned determination on the presence or absence of proper data is shown by a flowchart in FIG. 5. This processing is performed in the image processing unit 30 that is provided with a memory in which the required program data, parameter data, etc. are stored in advance. The main point of each step is as follows:

In Step S1, with respect to each scanning line used for image pickup in the photodetector 20, a check is first made whether or not at least one pixel whose luminance exceeds the threshold has been detected. Then, an average of the numbers of pixels individually detected on those scanning lines for each of which at least one pixel has been detected is determined. Hereinafter, the thus determined average of the numbers of detected pixels is represented by Nav.

In Step S2, a range of a proper number of detected pixels per one scanning line is determined. To this end, an upper limit Nmax and a lower limit Nmin are respectively calculated in accordance with the following equations (1), (2):

$$N\mathrm{min} = N\mathrm{av} \times \alpha\mathrm{min} \quad (1),$$

$$N\mathrm{max} = N\mathrm{av} \times \alpha\mathrm{max} \quad (2),$$

where $\alpha\mathrm{min}$ and $\alpha\mathrm{max}$ are minimum and maximum proper ratios that are set beforehand as parameters in such a manner that the relations of $0 < \alpha\mathrm{min} < 1$ and $\alpha\mathrm{max} > 1$ are satisfied. For example, Nav, $\alpha\mathrm{min}$, and $\alpha\mathrm{max}$ are set such that the relations of Nav=50, $\alpha\mathrm{min}$=0.8, and $\alpha\mathrm{max}$=1.2 are satisfied. In this case, the proper number of detected pixels varies in a range from 40 to 60.

Alternatively, the upper limit Nmax and the lower limit Nmin may be calculated in accordance with the following equations (3) and (4):

$$N\mathrm{min} = N\mathrm{av} - \beta \quad (3),$$

$$N\mathrm{max} = N\mathrm{av} + \gamma \quad (4),$$

wherein $\beta$ and $\gamma$ are a subtract number of pixels and an add number of pixels that are set beforehand as parameters in such a manner that the relations $0 < \beta$ and $0 < \gamma$ are satisfied. For example, Nav, $\beta$, and $\gamma$ are set such that the relations of Nav=50, $\beta$=8, and $\gamma$=9 are satisfied. In this case, the proper number of detected pixels varies in a range from 42 to 59. As with ordinary parameters, the preset values $\alpha\mathrm{min}$, $\alpha\mathrm{max}$; or $\beta$, $\gamma$ can appropriately be altered.

In Step S3, among all the scanning lines relating to the calculation of Nav, for those scanning lines for each of which pixels whose number falls within the allowable range from Nmin to Nmax has been detected, luminance data detected for the pixels on each scanning line is determined as being proper data that is to be used for the measurement of three-dimensional position information of the measurement object 1. Then, for each scanning line for which the proper data has been obtained, the well-known weighted mean processing is performed by using weights that are respectively proportional to the detected luminances of the pixels on the scanning line, whereby the detected position (center position) of the slit light is determined.

In Step S4, on the basis of the data of detected position of the slit light that is determined at Step S3, the calculation is performed to acquire three-dimensional position information of the measurement object 1, and the calculation result is stored. The three-dimensional position-related information of the measurement object 1 can for example be the position of a characteristic point representative of the measurement object 1, the orientation of a surface and/or the extending direction of a ridge line which represent the orientation of the measurement object 1, the shape of a profile, the size of the profile, and the like. Which of these parameters is to be calculated from the detection data obtained at Step S3 depends on application. A method of the calculation is well known and does not directly relate to features of this invention, and therefore, details of the method will be omitted.

In the embodiment explained above, the aforementioned processing is performed by the image processing unit 30. Alternatively, in a case where a robot is used, a robot controller may serve as the image processing unit 30 in a well known manner. In the embodiment, the scanning lines (parallel to the Hz axis in FIG. 2) used for image pickup in the photodetector 20 are adopted as the "scanning lines" to be used to count the detected pixels (that satisfy the threshold condition) corresponding to the bright portion. Alternatively, lines may be used that are different in their extending direction from the scanning lines used for the image pickup in the photodetector 20, as long as these lines are not in parallel to the linear bright portion image 4. For instance, it is possible to adopt "scanning lines" extending in parallel to the Vt axis (refer to FIG. 2) that is perpendicular to the scanning lines used for the image pickup in the photodetector 20.

What is claimed is:

1. A three-dimensional measurement apparatus for obtaining information related to three-dimensional position of an object based on detection of a position of a bright portion, which is formed substantially linearly by irradiating slit light or pseudo slit light created by scanning spot light onto the object, in an image of the object captured by image capturing means, said three-dimensional measurement apparatus comprising:

means for counting a number of brightened pixels belonging to the bright portion along each of a plurality of detection lines traversing the bright portion in the captured image;

means for determining an allowable range of the number of brightened pixels along one detection line based on the number of brightened pixels respectively counted along the plurality of detection lines; and means for adopting data of the brightened pixels along each detection line where the number of brightened pixels is within the allowable range as proper data for obtaining the information related to three-dimensional position of the object.

2. A three-dimensional measurement apparatus according to claim 1, wherein the information related to three-dimensional position of the object includes any one of a three-dimensional position, a three-dimensional posture, a three-dimensional shape and a size of the object.

3. A three-dimensional measurement apparatus according to claim 1, wherein said means for determining the allowable range comprises:

means for obtaining an average of the number of brightened pixels per one detection line based on the number of brightened pixels counted respectively along the plurality of detection lines; and means for calculating the allowable range based on the obtained average of the number of brightened pixels and minimum and maximum ratios to be respectively multiplied by the determined average of the number of brightened pixels.

4. A three-dimensional measurement apparatus according to claim 3, wherein the minimum and maximum ratios are alterable.

5. A three-dimensional measurement apparatus according to claim 1, wherein said means for determining the allowable range comprises: means for obtaining an average of the number of brightened pixels per one detection line based on the numbers of brightened pixels counted respectively along the plurality of detection lines; and means for calculating the allowable range based on the obtained average of the number of brightened pixels, a subtractive number to be subtracted from the obtained average of the number of brightened pixels, and an addition number to be added to the obtained average of the number of brightened pixels.

6. A three-dimensional measurement apparatus according to claim 5, wherein the subtractive number and the addition numbers are alterable.

* * * * *

UNITED STATES PATENT AND TRADEMARK OFFICE
CERTIFICATE OF CORRECTION

PATENT NO. : 7,486,816 B2
APPLICATION NO. : 10/962542
DATED : February 3, 2009
INVENTOR(S) : Atsushi Aizawa et al.

It is certified that error appears in the above-identified patent and that said Letters Patent is hereby corrected as shown below:

Title Page, Item (57) (Abstract), Line 8, change "amin" to --αmin--.

Title Page, Item (57) (Abstract), Line 8, change "amax" to --αmax--.

Title Page, Item (57) (Abstract), Line 11, change "amin, amax," to --αmin, αmax,--.

Signed and Sealed this

Seventh Day of April, 2009

JOHN DOLL
*Acting Director of the United States Patent and Trademark Office*